the 
United States Patent [19]

Meier, Jr et al.

[11] Patent Number: 5,521,756
[45] Date of Patent: May 28, 1996

[54] ANTISTATIC MICROSCOPE

[75] Inventors: Henry A. Meier, Jr, Orchard Park; Vincent Vaccarelli, Getzville, both of N.Y.

[73] Assignee: Leica Inc., Depew, N.Y.

[21] Appl. No.: 180,320

[22] Filed: Jan. 12, 1994

[51] Int. Cl.$^6$ .......................... G02B 21/00; G02B 21/26; G03B 11/04; B65D 27/18
[52] U.S. Cl. .................. 359/391; 359/380; 359/368; 359/507; 359/510; 428/35.2; 524/13; 206/484.2
[58] Field of Search .................................. 359/380, 383, 359/376, 507, 510, 512, 391, 368

[56] References Cited

U.S. PATENT DOCUMENTS

| | | | |
|---|---|---|---|
| 3,572,499 | 3/1971 | Mondano | 206/1 |
| 4,573,771 | 3/1986 | Hill | 359/383 |
| 4,618,222 | 10/1986 | Eisenberg | 359/507 |
| 4,690,519 | 9/1987 | Clark | 359/376 |
| 4,729,646 | 3/1988 | Clark et al. | 359/383 |
| 4,774,272 | 9/1988 | Lamphere et al. | 524/13 |
| 5,091,229 | 2/1992 | Golike et al. | 428/35.2 |

OTHER PUBLICATIONS

DSM Engineering Plastics, Electrafil R, Property Data, 1992.

DSM Engineering Plastics, An overview of Electrafil R static dissipative alloy based in ABS (ABS–1200/SD), Oct. 1992.

*Primary Examiner*—Paul M. Dzierzynski
*Assistant Examiner*—Mohammad Y. Sikder
*Attorney, Agent, or Firm*—Bean, Kauffman & Spencer

[57] ABSTRACT

Microscopes having plastic components such as knobs, covers and eyepiece rings are rendered antistatic by using static charge dissipating plastic materials instead of conventional plastics. Such antistatic microscopes are especially useful in the manufacture and inspection of semi-conductors which are easily damaged by exposure to static charges.

5 Claims, No Drawings

ANTISTATIC MICROSCOPE

BACKGROUND OF THE INVENTION

The present invention relates to microscopes and more particularly to microscopes having plastic components capable of dissipating static charges.

Conventional stereomicroscopes such as that taught by U.S. Pat. No. 4,690,519, issued Sep. 1, 1987, and compound microscopes such as that taught by U.S. Pat. No. 4,573,771 are used in the manufacture and inspection of semi-conductor components. While earlier examples of such microscopes were manufactured of metal, with the exception of optical components, the industry has substituted plastic for many of the components commonly used in such microscopes. Typical examples of such components are focusing knobs, zoom knobs, eyepiece adjusting rings, and covers for the body, as well as covers for the binocular assembly, all currently made using plastic. However, while numerous different plastics are currently used by various manufacturers and even by single manufacturers, they lack the advantage of being capable of dissipating static charges and place semi-conductor devices and components for such devices at risk of being permanently damaged or rendered useless as a result of exposure to such charges. Semi-conductor devices and components therefor are exposed to such charges, for example, when they are positioned on a microscope stage for inspection. As used herein, the term microscope includes the stand and focusing mechanism of either a compound microscope or stereomicroscope.

U.S. Pat. No. 4,618,222, issued Oct. 21, 1986, describes a protective cover to be positioned between the microscope and stage for supporting the object to be inspected. This patent teaches the need for an antistatic film to be applied to the plastic in order to prevent damage to the components by static charge. The film is then connected to ground.

BRIEF DESCRIPTION OF THE INVENTION

The present invention relates to antistatic microscopes having at least one plastic member susceptible to accumulating a static charge, which is manufactured from a static charge dissipating plastic. Preferably, the plastic will dissipate a charge of 5000 volts to 0 in less than 10 seconds in an environment of 15% relative humidity (rh). The charge is dissipated through one or more metal parts of the microscope to ground.

Numerous plastic materials are capable of dissipating static charges. These materials are conventionally formed by using a conductive filler, such as carbon or carbon fibers, or powdered metal, as well as combinations with conductive polymers. While plastics having conductive fillers such as metal or carbon are well known and require no further description, plastics using conductive polymers to provide static dissipating properties are relatively new. One example of a polymer having static dissipating properties is the group known as Stat-Rite® static dissipative polymers available from B. F. Goodrich Company and are suitable for use with acrylonitrile-butadiene-styrene (ABS), polycarbonate, polystyrene and modified polyphenylene oxide polymers. The Electrafil® group of static dissipating alloys is one example of a static accumulating material rendered static dissipating using the Stat-Rite® polymer. The Electrafil® ABS series of static dissipative thermoplastics are available from DSM Engineering Plastics of 2267 West Mill Road, located in Evansville, Ind. These plastics have additional advantages of resisting the accumulation of static charges as well as rapidly dissipating any accumulated charge.

DESCRIPTION OF THE PREFERRED EMBODIMENT

The zoom control knobs, eyepiece focusing rings, body cover and binocular covers of a stereomicroscope similar to that taught in U.S. Pat. No. 4,690,519 and the focusing knobs of a stand similar to that taught in U.S. Pat. No. 4,729,646 were injection molded using Electrafil® ABS-1200/SD plastic obtained from DSM Engineering Plastics. These plastic members of a microscope had a static rate of 5000 volts to 0 at 15% relative humidity of less than 2 seconds using Federal Test Standard 101° C. method 46. Charges accumulated on the focusing knobs are dissipated through the metal focusing shaft to the grounded metal stand. Charges accumulated on the body cover are dissipated directly to the grounded metal stand supporting the microscope. Charges accumulated on the binocular covers and eyepiece focusing rings are dissipated through the metal microscope frame and body cover to the grounded metal stand.

What is claimed is:

1. A microscope used for examining components sensitive to damage by static charges, having a conductive metal microscope part connected to an injection molded plastic microscope part susceptible to accumulating a static charge, comprising said plastic microscope part consisting essentially of a static non-dissipating polymer and a static dissipative polymer wherein static charges are rapidly dissipated through said conductive part.

2. A microscope according to claim 1, wherein said static non-dissipating polymer is an ABS polymer and said static dissipative polymer is dispersed therein.

3. A microscope according to claim 2, wherein said plastic part is a body cover, co-axial cover, adjustment knob, or adjustment ring.

4. A microscope according to claim 3, wherein there are a plurality of said plastic part.

5. A microscope according to claim 4, wherein said plastic part has a 5000 to 0 volt static decay rate @ 15% relative humidity of less than 10 seconds.

* * * * *